United States Patent [19]
Szucs et al.

[11] 3,857,911
[45] Dec. 31, 1974

[54] APPARATUS FOR HEAT- AND MASS TRANSFER BETWEEN LIQUIDS AND GASES

[75] Inventors: Laszlo Szucs; Csaba Tasnadi; Istvan Lindner, all of Budapest, Hungary

[73] Assignee: Energiagazdalkodasi Intezet, Budapest, Hungary

[22] Filed: Jan. 23, 1974

[21] Appl. No.: 435,984

[52] U.S. Cl. .................................. 261/112, 55/240
[51] Int. Cl. ............................................. F28c 1/04
[58] Field of Search ...... 261/112, 110, 111; 55/240, 55/241

[56] References Cited
UNITED STATES PATENTS

| | | | |
|---|---|---|---|
| 3,416,775 | 12/1968 | Szucs et al. | 261/112 |
| 3,743,256 | 7/1973 | Oplatka | 261/112 X |
| 3,795,388 | 3/1974 | Toth | 261/112 |

Primary Examiner—Frank W. Lutter
Assistant Examiner—William Cuchlinski, Jr.
Attorney, Agent, or Firm—Ernest F. Marmorek

[57] ABSTRACT

Heat- and mass transfer takes place whenever flow materials contact each other directly. The transfer is the more efficient the greater the contact surface between the contacting media. Therefore, the cooling water in wet cooling towers is supplied to large surface units with liquid withdrawing means on which a thin film is formed and efficiently cooled down by contact with flowing air.

The liquid withdrawing means of such apparatus, however, may not be evenly wetted by the downflowing liquid which may have been unduly tapped off by preceding liquid withdrawing means.

It is suggested to provide the liquid withdrawing means with baffle means which expose those sides of the liquid withdrawing means which face the liquid inlet and the front surfaces of which face the liquid distributor surface, the angles of inclination of these front surfaces being smaller than the inclination angle of the liquid distributor surface. By such means the surplus amounts of liquid will be supplied to liquid withdrawing means lying further back so that enough water will be at disposal for suitable wetting.

3 Claims, 4 Drawing Figures

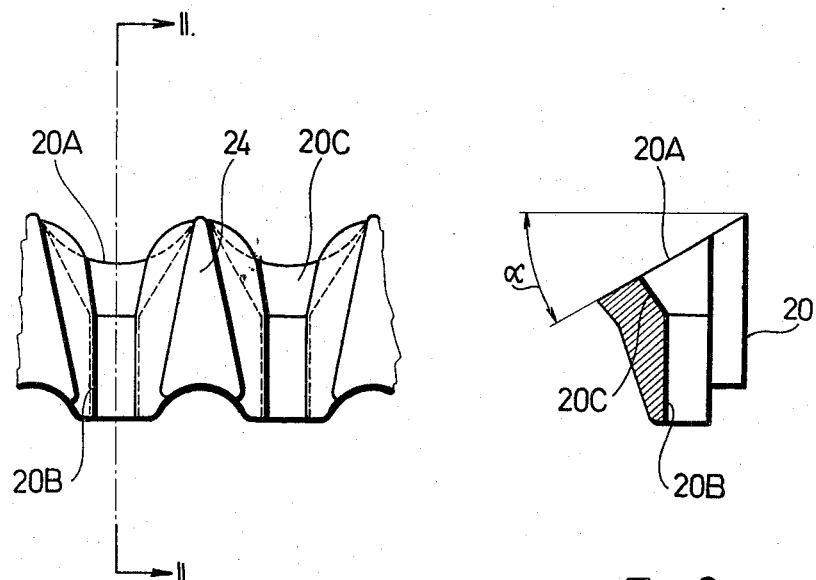
Fig. 3
Fig. 2
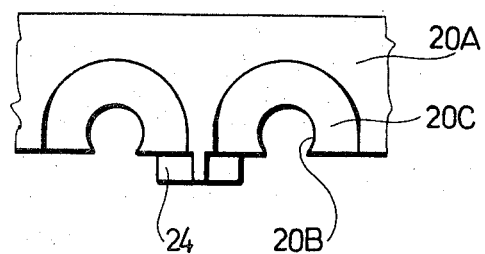
Fig. 4

APPARATUS FOR HEAT- AND MASS TRANSFER BETWEEN LIQUIDS AND GASES

The invention relates to apparatus for heat- and mass transfer between fluids such as liquids and gases.

As is known, heat- and mass transfer takes place whenever flow materials contact each other directly. The heat- and mass transfer is, among other things, the more efficient the greater the contact surface between the contacting media. Thus, for instance, cooling water in wet cooling towers is, possibly evenly distributed, supplied to large surface units of the cooling tower on which the cooling water flows downwardly in the form of a thin film under the action of gravity and is cooled down by contacting flowing air. Such cooling tower unit is described e.g. in Hungarian Pat. specification No. 154 201. The essence of the known apparatus consists in that a liquid distributor surface is provided between a liquid inlet and a liquid outlet. The liquid distributor surface faces, the liquid outlet and serves for forming a liquid film thereon. Furthermore, it has liquid withdrawing means connected to it one behind the other in several rows which lead from the liquid distributor surface into the liquid outlet so that liquid portions which do not evaporate and, therefore, do not escape in the form of vapours, will be drawn off through the liquid outlet and may serve for heating. The liquid withdrawing means may have the form of wires, bands, rods, sticks, etc., which will be wetted by a film of the downflowing liquid.

With the known apparatus, however, the liquid withdrawing means are not evenly wetted by the downflowing liquid. The liquid film is retained on the liquid distributor surface against the action of gravity by surface forces and tensions, the balance being of dynamic character. This means that the liquid will adhere to the liquid distributor surface in case of fluid velocities only which are higher than a certain limit value. With fluid velocities below such limit value the liquid film is torn off the liquid distributor surface. The higher the aforesaid limit value, the higher the permissible liquid load. Tearing off of the liquid film prevents several of the liquid withdrawing means downstream the place of parting from getting wetted whereby the performance of the unit becomes considerably reduced. The direct reason for the liquid film to be torn off is that if impinges at the roots of the liquid withdrawing means so that it gradually looses its velocity until the latter reaches the aforesaid limit value beyond which the liquid film parts with the liquid distributor surface. It is due to this that, with a given number of liquid withdrawing means in the flow direction, an upper limit is set to the permissible liquid load although in certain cases such as cooling towers with natural draught the apparatus is the more economic the higher the permissible liquid load. Therefore, the aforesaid upper limit is felt as a deficiency of the otherwise very reliable known cooling towers.

The main object of the present invention is to eliminate such deficiency and to provide an apparatus for heat- and mass transfer with which even liquid withdrawing means further back are uniformly wetted so that the performance of the apparatus becomes considerably greater by an increase of the liquid load. The basic idea of the invention starts from the recognition that liquid withdrawing means which become wetted first, tap off more liquid from the liquid film than they would require for their getting evenly wetted. Thus, it is necessary that the surplus amounts of liquid be supplied to liquid withdrawing means lying further back. Hereby two favourable results are obtained. On the one hand, also liquid withdrawing means lying further back will be wetted and wetted evenly and, on the other hand, all liquid withdrawing means will be wetted evenly since liquid withdrawing means lying further back receive surplus liquid amounts and, thus, all liquid withdrawing means may receive enough liquid for getting wetted.

The surplus liquid will be supplied to liquid withdrawing means lying further back by baffle means on each liquid withdrawing means. They are required to permit only portions of the supplied amount of liquid to proceed which are necessary for wetting the respective liquid withdrawing means whereas the surplus amount will be retained and supplied back to the main flow of the liquid. The first requirement is fulfilled by that the baffle means surround the liquid withdrawing means on one side only. The second requirement is met by that extensions of the front surfaces of the baffle means facing the liquid distributor surface in the flow direction of the liquid film intersect the liquid distributor surface. Then liquid which rebounds from the front surfaces of the baffle means will impinge on the liquid distributor surface or directly on baffle means lying further back and, thereby, enough liquid will be at disposal for wetting all liquid withdrawing means.

Summarily, the invention is concerned with an apparatus for heat- and mass transfer between fluids such as liquids and gases comprising, in a manner known per se, an inclined and film forming a liquid distributor surface between a liquid inlet and a liquid outlet, said liquid distributor surface facing said liquid outlet, and liquid withdrawing means provided in several rows one behind the other which lead from the liquid distributor surface into the liquid outlet. The invention consists in that the liquid withdrawing means have baffle means provided on them exposing the side of the liquid withdrawing means which face said liquid inlet, their front surfaces facing and inclining in the same direction as the liquid distributor surface, the angle of inclination of the front surfaces of the baffle means being smaller than the angle of inclination of the liquid distributor surface.

Partial exposure of the side of the liquid withdrawing means ensures that, they will continuously be wetted. A difference in the inclination angles means that extensions of the front surfaces of the baffle means intersect the liquid distributor surface so that any liquid rebounded from the front surfaces will again be admixed to the main flow of liquid.

In order to ensure the exact amounts of liquid for wetting the liquid withdrawing means a truncated crater will be provided in the inclined front surface of each baffle means around the liquid withdrawing means, which guarantees that the amount of liquid needed for wetting the liquid withdrawing means below the baffle means is enabled to proceed further from thereabove and will not, by chance, rebound from the surface thereof. Furthermore, the baffle means of liquid withdrawing means in the same row will preferably form an integral unit in which case no special spacers have to be employed for fixing the mutual distances of neighbouring liquid withdrawing means.

Further details of the invention will be described by taking reference to the accompanying drawings which show, by way of example, an embodiment of the apparatus according to the invention and in which:

FIG. 2 is a sectional view taken along the line II—II of FIG. 3.

FIG. 3 illustrates a front elevational view of a detail at a relatively larger scale.

FIG. 4 represents a plan view corresponding to FIG. 3.

Figure 1:
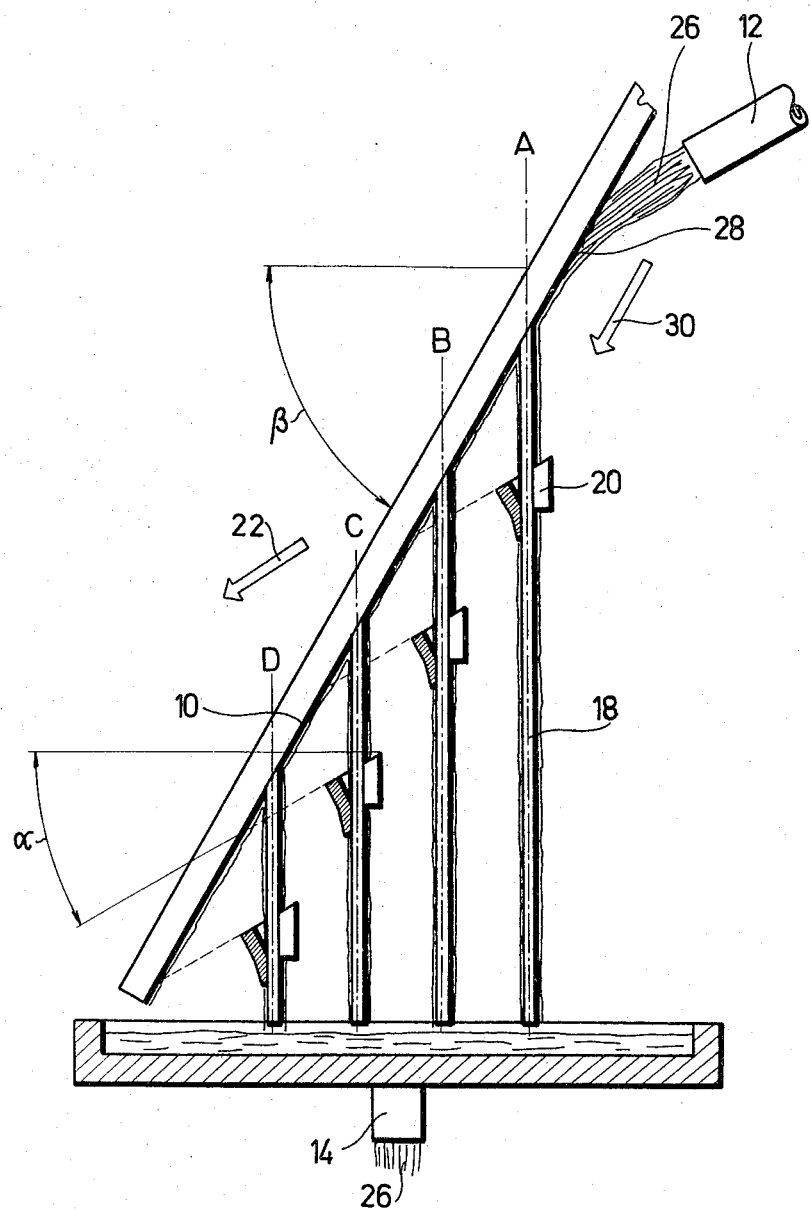
FIG. 1 is a side elevational view partly in section.

In the drawing, FIG. 1 shows an inclined liquid distributor surface 10 between a liquid inlet and a liquid outlet. With the represented embodiment, the liquid inlet consists of a pipe 12 while the liquid outlet is represented by a tray 16 with a liquid outlet stud 14. The liquid distributor surface 10 is facing the liquid outlet which is the tray 16 and its outlet stud 14, and has liquid withdrawing means connected to it which are arranged in a plurality of rows A, B, C and D placed one behind the other in the flow direction 30 of the liquid. Such means are represented in the instant case as rods of which one is designated by reference numeral 18 in FIG. 1. The rods 18 lead into the tray 16.

In compliance with the main feature of the present invention the liquid withdrawing means or, in the instant case, the rods 18 hafe baffle means arranged on them. They are formed by blocks 20 (FIGS. 2 to 4) which uncover the side of the rods in the direction of the liquid inlet pipe 12. The upper front surface $\phi$ 20A of the blocks 20 (FIGS. 2 to 4) facing the liquid distributor surface 10 is inclined in the same direction 22 as the latter. The angle $\alpha$ of inclination of the front surface 20A is smaller than the angle $\beta$ of inclination of the liquid distributor surface 10 so that extensions of the front surfaces 20A intersect the liquid distributor surface 10 as is suggested by broken lines in FIG. 1.

FIG. 2 shows a block 20 without its rod 18. It will be seen that the passage 20B around the rod 18 goes over into a truncated crater or cone 20C which forms a baffle surface towards the free or open side of the block 20.

FIGS. 3 and 4 show blocks in one of the rows A, B, C or D. The blocks 20 form an integral part 24. When the rods 18 engage the passages 20B, they are held in well defined mutual distances, without the employment of special spacers which is advantageous with respect to mounting operation, and maintainance.

In operation. a liquid 26 such as cooling water is supplied through the pipe 12 and arrives to the liquid distributor surface 10 on which it forms, due to its velocity and to surface tensions, a liquid film 28. The liquid film 28 proceeds in the direction of arrow 30 and impinges on the rods 18 of the first row A whereby the liquid film 28 becomes, as it were, tapped at several points. A portion of its parts with the liquid distribution surface 10 and would flow into the tray 16 if it were not for the baffle means of the rods 18. The downflowing liquid impinges on the front surfaces 20A of the blocks 20 whereby liquid portions which cannot escape through the truncated crater 20c rebound onto the liquid distributor surface 10 where they reunite with the liquid film 28 which is now thinner as liquid has been tapped off by the rods 18 of the row A. Such performance is repeated on the rods 18 of row B, and so on.

Thus, each rod 18 will lead down a certain amount of liquid defined by its associated truncated crater 20C. Such liquid will be evenly distributed along the total surface of the rods 18 once the blocks 20 are left behind. This means in addition to a uniform load and, thereby, to a good exploitation of the rods 18, also a very effective heat- and mass transfer. Viz., the air flowing transversely between the rods 18, as regards the plane of FIG. 1, is contacted by the liquid at a maximum surface so that the heat of the liquid is taken over by the air (heat transfer) and withdraws together with the evaporated portion of the liquid (mass transfer). At the same time, the liquid is effectively cooled down.

The cooled down liquid 26 collects in the tray 16 and withdraws through the stud 14.

It will be seen that the blocks 20 are of paramount importance as regards the liquid load of the apparatus:

They ensure that the rods 18 in the rows B, C and D further back receive just as much liquid as the rods of the first row A. Thus, all rods 18 of all rows will participate in the heat- and mass transfer at even loads. Obviously, this is an important advantage as regards design, dimensions and operational conditions in contrast to known apparatus of similar destination.

What we claim is:

1. In an apparatus for heat- and mass transfer between liquids and gases comprising, in combination, a liquid distributor surface inclined between a liquid inlet and a liquid outlet, said liquid distributor surface facing said liquid outlet, liquid withdrawing means provided in several rows one behind the other which lead from said liquid distributor surface into said liquid outlet, baffle means provided on said liquid withdrawing means and exposing the sides of the latter facing the liquid inlet, said baffle means having front surfaces facing the and inclining in the same direction as the liquid distributor surface, the angle of inclination of the front surfaces of the baffle means being smaller than the angle of inclination of the liquid distributor surface so that extensions of said front surfaces intersect said liquid distributor surface for reuniting surplus liquid from said baffle means to a main liquid film formed on said liquid distributor surface.

2. In an apparatus as claimed in claim 1 the further improvement of the inclined front surfaces of the baffle means facing the liquid distributor surface being provided with truncated craters which surround said liquid withdrawing means.

3. In an apparatus as claimed in claim 1 the further improvement of the baffle means of the same row being integral with one another and forming spacers between adjacent liquid withdrawing means.

* * * * *